United States Patent
Gallier et al.

(10) Patent No.: US 10,569,481 B2
(45) Date of Patent: Feb. 25, 2020

(54) SHAPED COMPOSITE PLY LAYUPS AND METHODS FOR SHAPING COMPOSITE PLY LAYUPS

(71) Applicant: General Electric Company, Schenectady, NY (US)

(72) Inventors: Kirk D. Gallier, Liberty Township, OH (US); Nathan Carl Sizemore, Hamilton, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/632,739

(22) Filed: Jun. 26, 2017

(65) Prior Publication Data
US 2018/0370158 A1     Dec. 27, 2018

(51) Int. Cl.
*B29C 70/30*     (2006.01)
*F01D 5/28*     (2006.01)
(Continued)

(52) U.S. Cl.
CPC ............ *B29C 70/30* (2013.01); *B29C 70/545* (2013.01); *B29D 99/0028* (2013.01); *B32B 5/02* (2013.01);
(Continued)

(58) Field of Classification Search
CPC ....... F05D 2300/6034; C04B 35/62227; C04B 35/80; C04B 2235/5268; B32B 2307/08;
(Continued)

(56) References Cited

U.S. PATENT DOCUMENTS

| 3,235,346 A | 2/1966 | Hucke |
| 5,198,282 A | 3/1993 | Baker et al. |

(Continued)

FOREIGN PATENT DOCUMENTS

| CN | 109139126 A2 | 1/2019 |
| EP | 1 555 391 A2 | 7/2005 |

(Continued)

OTHER PUBLICATIONS

U.S. Appl. No. 15/184,149, filed Jun. 16, 2016.
(Continued)

*Primary Examiner* — Alex B Efta
(74) *Attorney, Agent, or Firm* — Dority & Manning, P.A.

(57) ABSTRACT

Ply layups and methods for forming composite components are provided. For example, a method for forming a composite component comprises laying up a plurality of composite plies to form a composite ply layup; partially processing the composite ply layup to form a green state layup; machining the green state layup; assembling the green state layup with one or more sub-assemblies; and processing the green state layup and the one or more sub-assemblies to form the composite component. In an exemplary embodiment, the composite component is a turbine nozzle airfoil. Another exemplary method comprises laying up a plurality of composite plies to form a composite ply layup; compacting the composite ply layup to form a green state layup; machining the green state layup; assembling the green state layup with one or more sub-assemblies; and processing the green state layup and the one or more sub-assemblies to form the composite component.

17 Claims, 7 Drawing Sheets

(51) Int. Cl.
    *F01D 5/18*         (2006.01)
    *B32B 18/00*       (2006.01)
    *B29C 70/54*       (2006.01)
    *B29D 99/00*       (2010.01)
    *B32B 5/02*         (2006.01)
    *B29L 31/08*       (2006.01)
    *B32B 1/00*         (2006.01)

(52) U.S. Cl.
    CPC ............... *B32B 18/00* (2013.01); *F01D 5/18* (2013.01); *F01D 5/282* (2013.01); *F01D 5/284* (2013.01); *B29L 2031/08* (2013.01); *B32B 1/00* (2013.01); *B32B 2307/306* (2013.01); *B32B 2603/00* (2013.01); *C04B 2237/52* (2013.01); *F05D 2230/23* (2013.01); *F05D 2300/6033* (2013.01)

(58) Field of Classification Search
    CPC ............. B32B 18/00; B32B 2307/306; B32B 2603/00; B29C 70/30; B29C 70/545; B29D 99/0028; F01D 5/18; F01D 5/282; F01D 5/284
    See application file for complete search history.

(56) References Cited

U.S. PATENT DOCUMENTS

| | | | |
|---|---|---|---|
| 5,436,042 | A | 7/1995 | Lau et al. |
| 5,632,834 | A * | 5/1997 | Ostertag ............... B32B 18/00 |
| | | | 156/173 |
| 6,024,898 | A * | 2/2000 | Steibel ................ C04B 35/806 |
| | | | 264/29.1 |
| 7,066,717 | B2 * | 6/2006 | Morrison .............. F01D 5/187 |
| | | | 29/889.71 |
| 7,169,465 | B1 | 1/2007 | Karandikar et al. |
| 7,510,379 | B2 | 3/2009 | Marusko et al. |
| 7,550,107 | B2 | 6/2009 | Morrison et al. |
| 8,151,437 | B2 | 4/2012 | Muller et al. |
| 8,491,743 | B2 | 7/2013 | Pham et al. |
| 8,978,729 | B2 | 3/2015 | Pham et al. |
| 9,050,769 | B2 | 6/2015 | Monaghan et al. |
| 9,090,027 | B2 | 7/2015 | Sutton et al. |
| 9,259,858 | B2 | 2/2016 | Gupta et al. |
| 9,482,108 | B2 | 11/2016 | Garcia Crespo |
| 9,499,253 | B1 | 11/2016 | White |
| 2003/0024630 | A1* | 2/2003 | George ................. B32B 5/12 |
| | | | 156/182 |
| 2004/0163262 | A1 | 8/2004 | King et al. |
| 2005/0158171 | A1* | 7/2005 | Carper ................ B32B 18/00 |
| | | | 415/200 |
| 2006/0283014 | A1* | 12/2006 | Subramanian ........ C04B 35/573 |
| | | | 29/889.71 |
| 2009/0165924 | A1* | 7/2009 | Steibel ................ F01D 5/147 |
| | | | 156/89.11 |
| 2012/0255870 | A1* | 10/2012 | Rebak ................. F01D 5/147 |
| | | | 205/670 |
| 2013/0185924 | A1 | 7/2013 | Bellanger et al. |
| 2014/0294572 | A1 | 10/2014 | Hillier et al. |
| 2015/0217508 | A1* | 8/2015 | Rossi ................ B29D 99/0007 |
| | | | 428/80 |
| 2016/0003094 | A1 | 1/2016 | Renggli et al. |
| 2016/0265370 | A1 | 9/2016 | Benson |
| 2016/0289127 | A1* | 10/2016 | Ackerman ............ C04B 35/521 |
| 2017/0101873 | A1 | 4/2017 | Morgan et al. |
| 2017/0122113 | A1 | 5/2017 | Kittleson et al. |

FOREIGN PATENT DOCUMENTS

| | | |
|---|---|---|
| EP | 2 728 125 A1 | 5/2014 |
| EP | 3 421 233 | 2/2019 |
| JP | 2004/034448 A | 2/2004 |
| JP | 2005/201244 A | 7/2005 |
| JP | 2014/001723 A | 1/2014 |

OTHER PUBLICATIONS

Extended European Search Report and Opinion issued in connection with corresponding EP Application No. 18177120.5 dated Oct. 24, 2018.
CA Office Action Application No. 3008305 dated May 13, 2019.
Japanese Office Action Corresponding to Application No. 2018116551 dated Oct. 8, 2019.

* cited by examiner

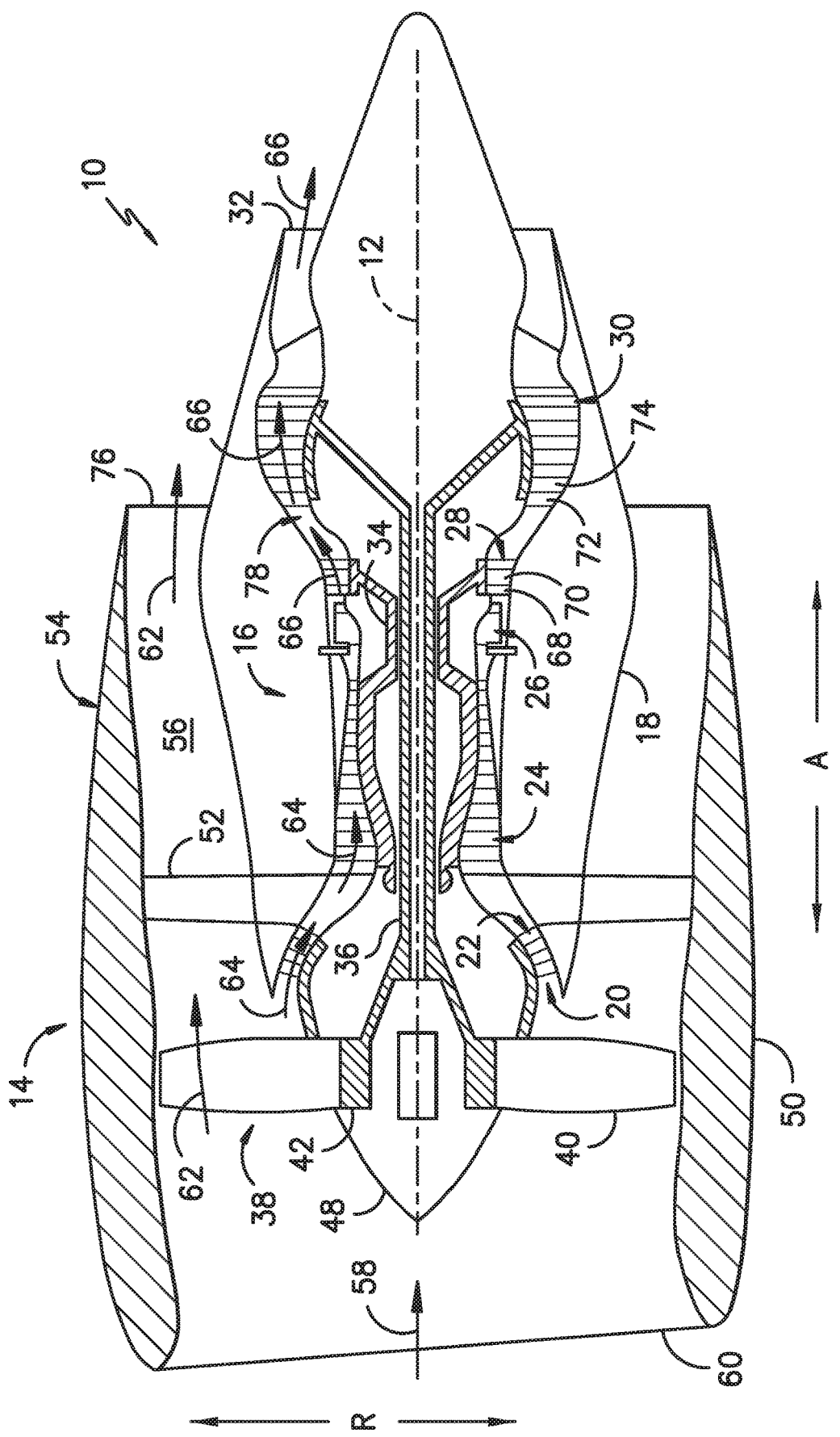
FIG. -1-

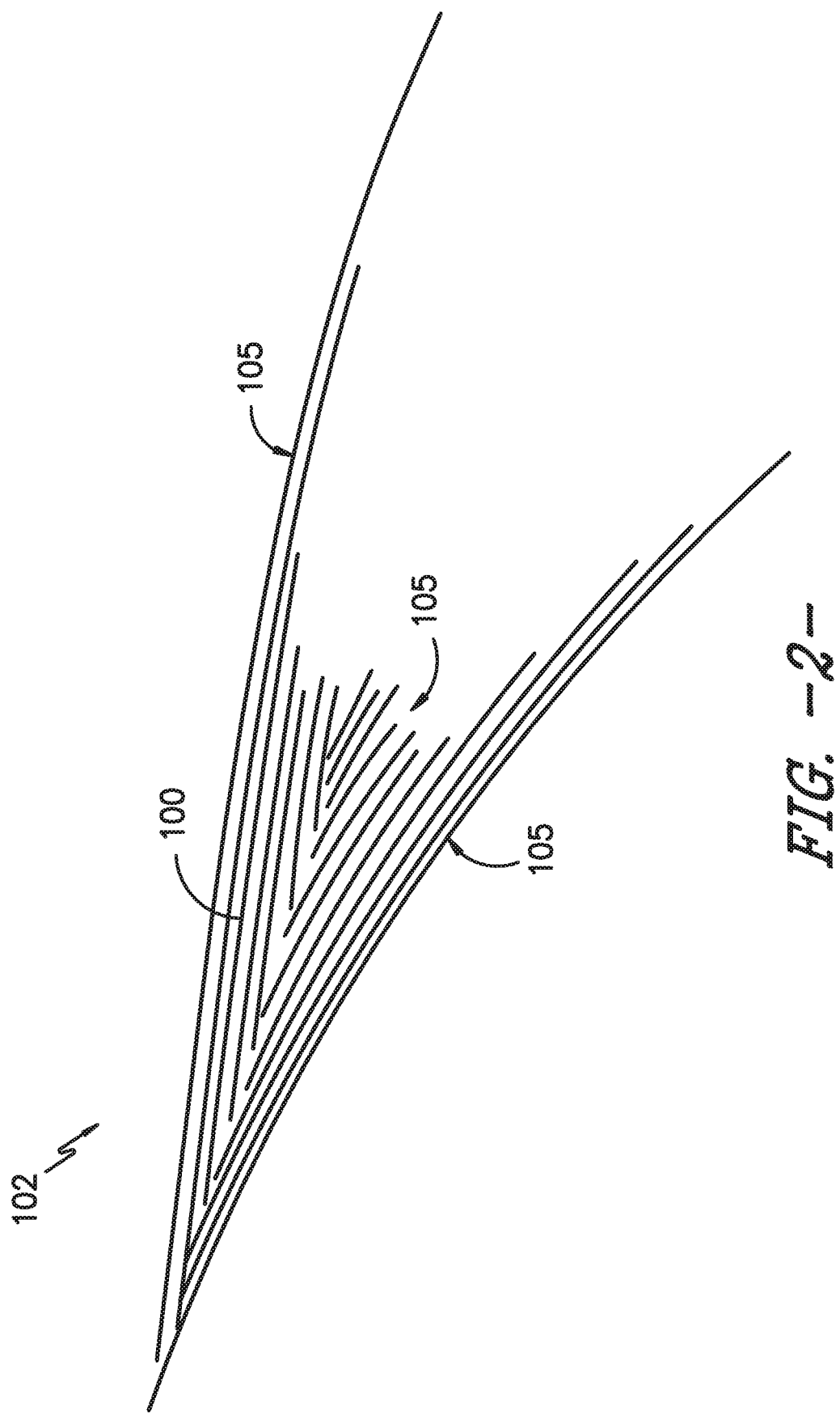
FIG. -2-

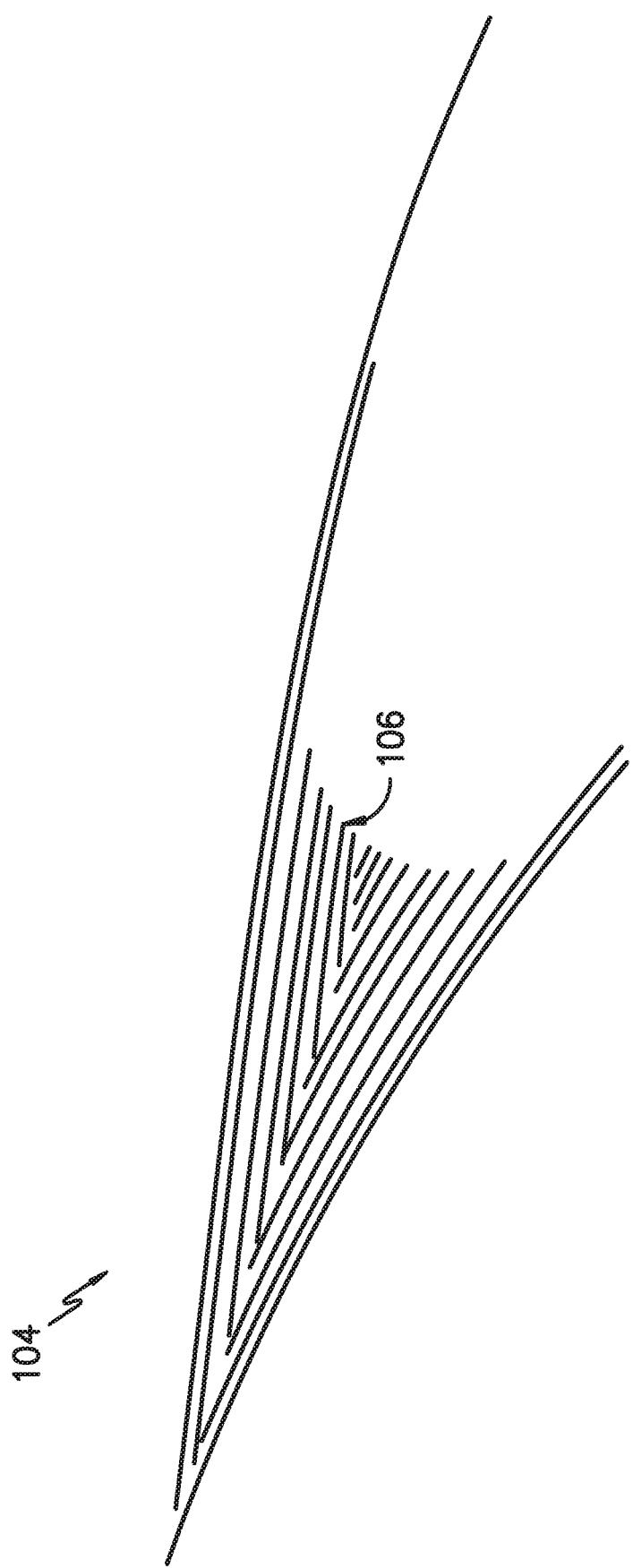

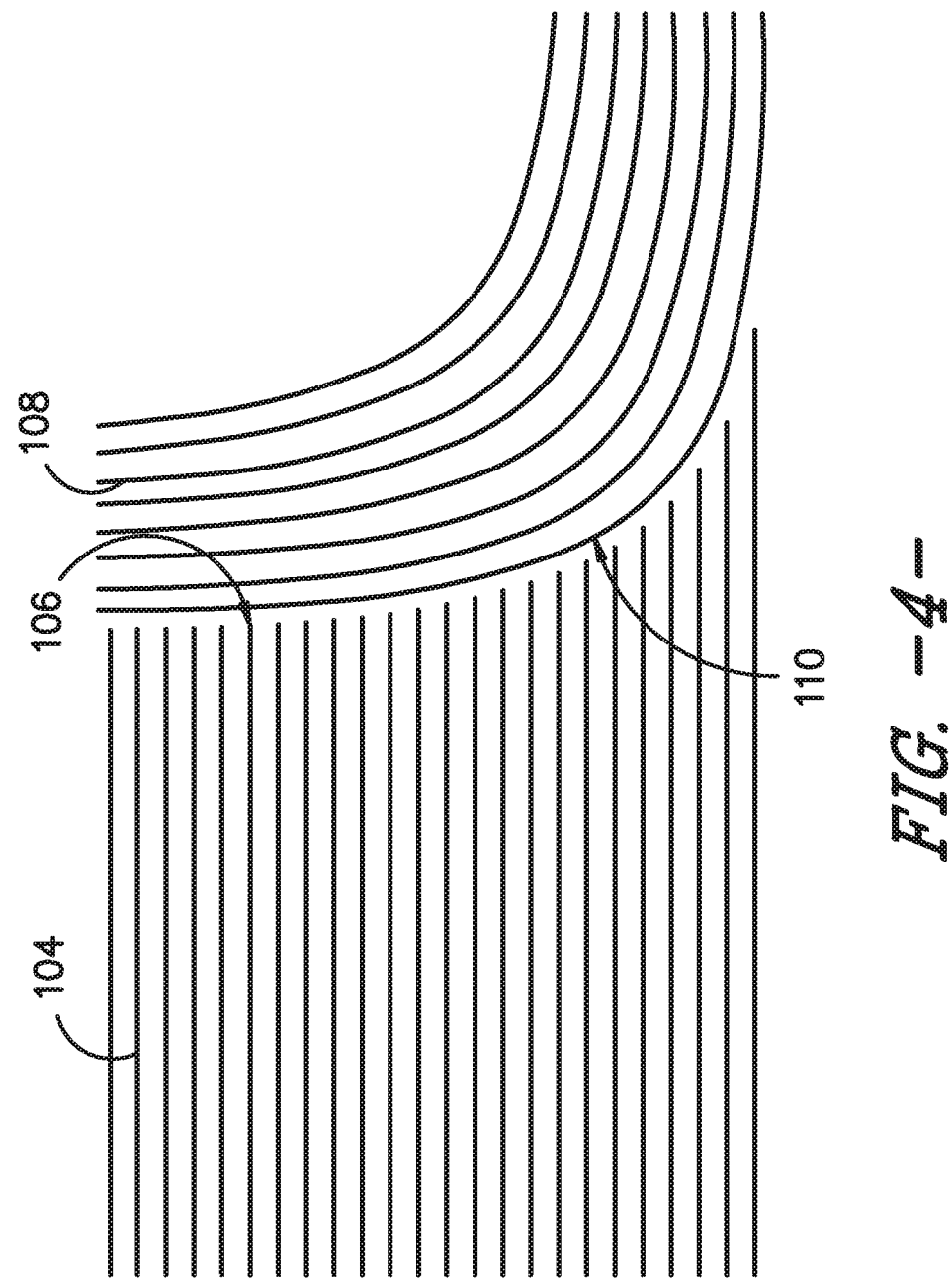

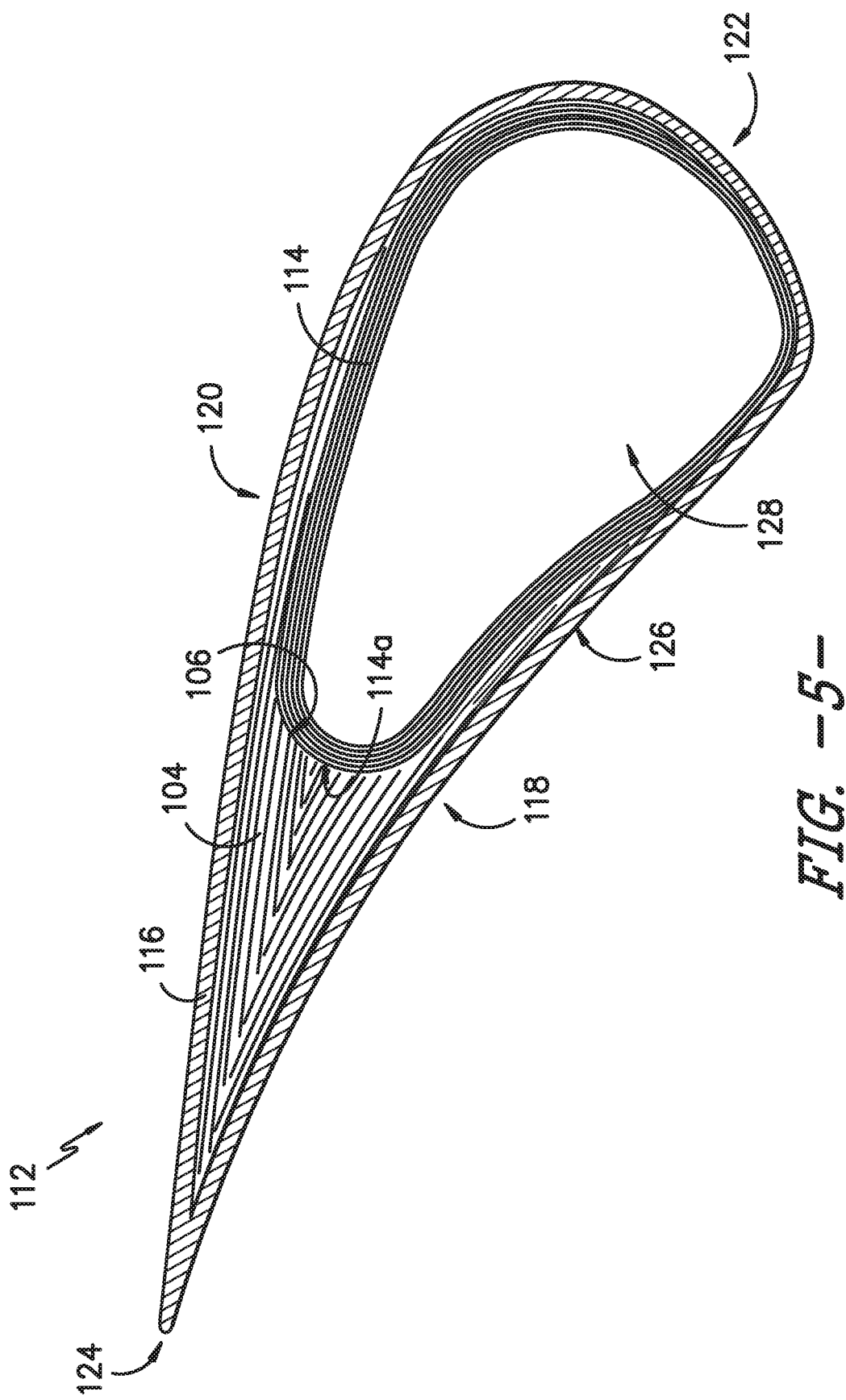
FIG. -5-

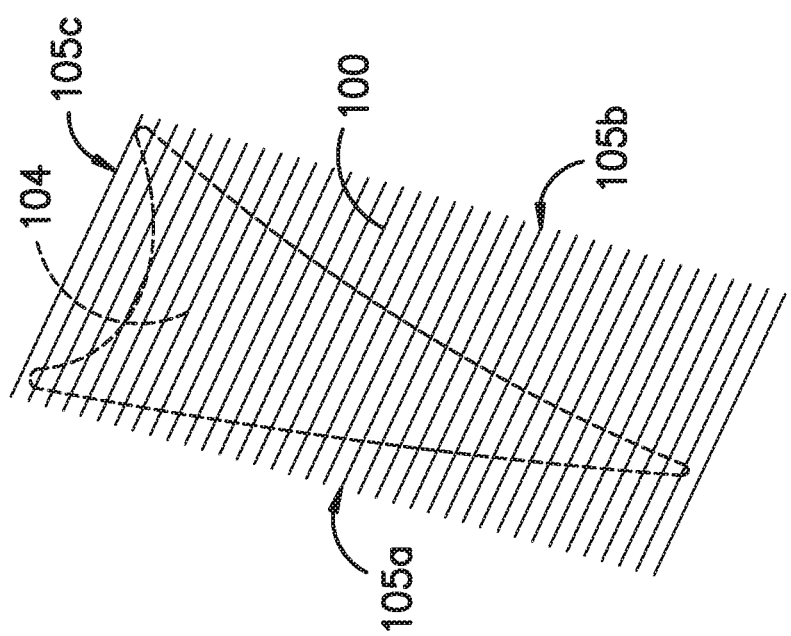
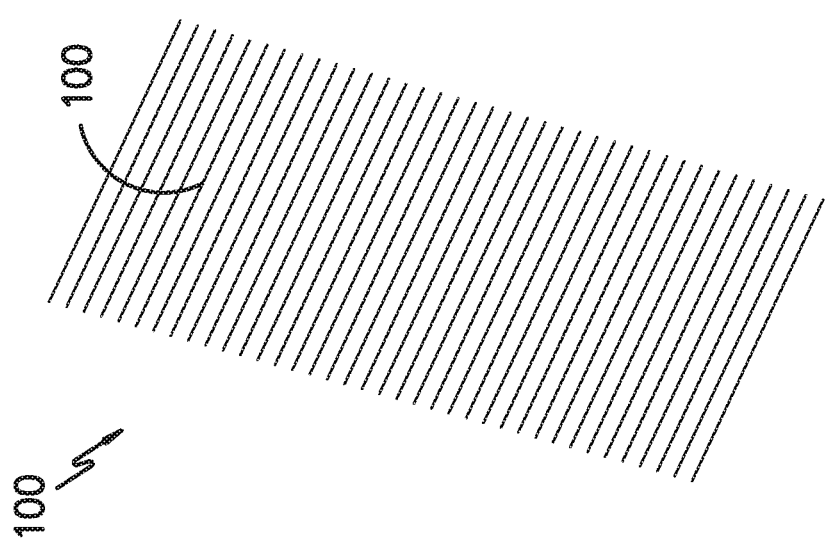

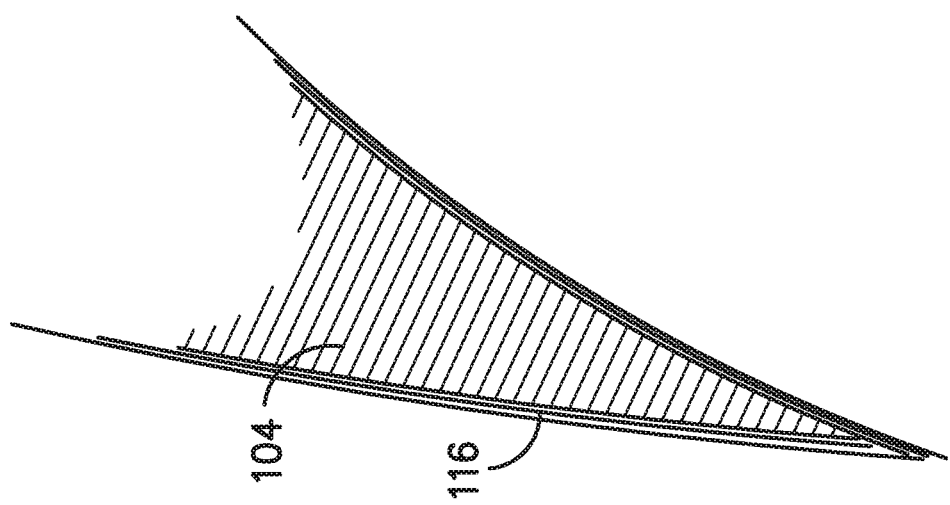
FIG. -6D-
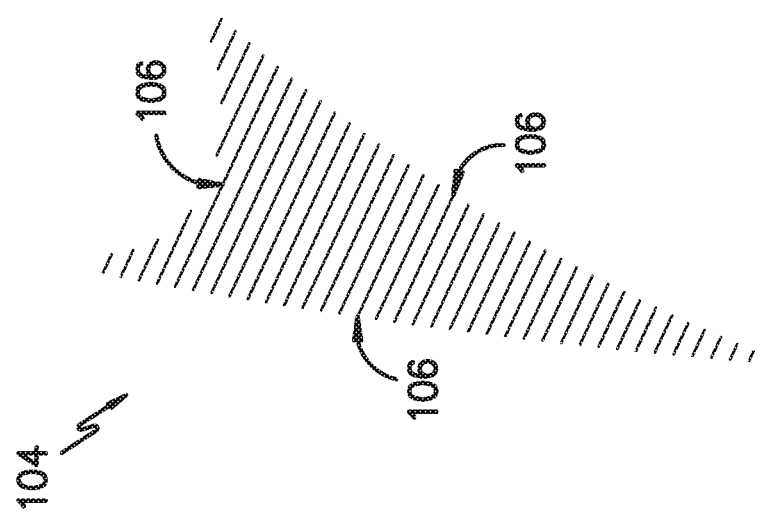
FIG. -6C-

SHAPED COMPOSITE PLY LAYUPS AND METHODS FOR SHAPING COMPOSITE PLY LAYUPS

FIELD

The present subject matter relates generally to composite components. More particularly, the present subject matter relates to composite material ply layups and methods for shaping composite material ply layups.

BACKGROUND

More commonly, non-traditional high temperature composite materials, such as ceramic matrix composite (CMC) and polymer matrix composite (PMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio.

Often, composite components are formed at least in part from a plurality of plies of the composite material. The composite plies may be cut from a tape or sheet of a composite matrix, which also may comprise other constituents such as solvents and binders, and then stacked to form a composite ply layup. Typically, stacks of plies have irregular finished edges and the plies may move relative to one another as the ply stack is processed to form the composite component. The irregular finished edges as well as the relative motion between the plies may leave gaps in an assembly of composite ply sub-assemblies, such as an assembly of composite ply layups, composite plies, composite ply packs, etc. Such gaps may require a filler material and/or additional densification material to reduced or eliminate the gaps, which may increase manufacturing complexity, time, and/or cost of composite components. Further, such gaps may reduce the integrity of the composite component, which may decrease part yield and increase part scrap rate, as well as decrease time on wing and unplanned service calls for repairs.

Accordingly, improved composite components and methods for forming composite components would be useful. In particular, methods for forming composite components that yield composite ply assemblies with fewer or no gaps between composite plies and/or composite ply sub-assemblies would be beneficial. As an example, methods for green machining a composite ply layup to shape one or more surfaces or edges of the layup for a better fit with an adjacent composite ply sub-assembly would be advantageous.

BRIEF DESCRIPTION

Aspects and advantages of the invention will be set forth in part in the following description, or may be obvious from the description, or may be learned through practice of the invention.

In one exemplary embodiment of the present subject matter, a method for forming a composite component is provided. The method comprises laying up a plurality of composite plies to form a composite ply layup; partially processing the composite ply layup to form a green state layup; machining the green state layup; assembling the green state layup with one or more sub-assemblies; and processing the green state layup and the one or more sub-assemblies to form the composite component.

In another exemplary embodiment of the present subject matter, a method for forming a composite component is provided. The method comprises laying up a plurality of composite plies to form a ply pack; partially processing the ply pack to form a green state ply pack; machining the green state ply pack to define a machined surface along the green state ply pack; assembling the green state ply pack with a cavity preform; and processing the green state ply pack and cavity preform to form the composite component. In this exemplary embodiment, the composite component is a turbine nozzle airfoil.

In a further exemplary embodiment of the present subject matter, a method for forming a composite component is provided. The method comprises laying up a plurality of composite plies to form a composite ply layup; compacting the composite ply layup to form a green state layup; machining the green state layup; assembling the green state layup with one or more sub-assemblies; and processing the green state layup and the one or more sub-assemblies to form the composite component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a cross-section view of a composite ply layup according to an exemplary embodiment of the present subject matter.

FIG. 3 provides a cross-section view of the composite ply layup of FIG. 2 that has been partially processed to form a green state layup and has been machined in its green state, according to an exemplary embodiment of the present subject matter.

FIG. 4 provides a cross-section view of a portion of a green machined composite ply sub-assembly positioned against another sub-assembly according to an exemplary embodiment of the present subject matter.

FIG. 5 provides a cross-section view of a plurality of composite sub-assemblies assembled to define a composite turbine nozzle airfoil according to an exemplary embodiment of the present subject matter.

FIG. 6A provides a cross-section view of a composite ply layup according to an exemplary embodiment of the present subject matter.

FIG. 6B illustrates an outline of a preform to be defined by green machining the composite ply layup of FIG. 6A.

FIG. 6C provides a cross-section view of the composite ply layup of FIG. 6A that has been partially processed to form a green state layup and has been machined in its green state to define the outline illustrated in FIG. 6B.

FIG. 6D provides a cross-section view of a plurality of composite sub-assemblies assembled to define a composite turbine nozzle airfoil trailing edge portion according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material, a polymer matrix composite (PMC) material, or other suitable composite material having high temperature capability. Composite materials generally comprise a fibrous reinforcement material embedded in matrix material, such as polymer or ceramic material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

As stated, it may be desirable to form components of the engine 10, such as components within or defining the hot gas path 78, e.g., stator vanes 68, 72, turbine rotor blades 70, 74, and/or other components, from composite materials such as CMC or PMC materials. The components may be formed from a plurality of plies of the composite material, which are laid up together and/or assembled with other sub-assemblies, such as ply packs, preforms, and/or a stack of composite plies, to define the composite component. However, during subsequent processing of the composite plies, the plies may move relative to one another and/or relative to the other sub-assemblies, which may leave gaps in the assembly. Although a filler material, such as rolled pieces of composite matrix, may be inserted into the gaps, a better final assembly fit between the sub-assemblies, without the use of the filler material, would be desirable. A better fit between the sub-assemblies may be achieved by reducing the relative motion between the sub-assemblies during assembly and processing, as well as by shaping one or more sub-assemblies to more precisely fit with an adjacent sub-assembly. An improved fit between sub-assemblies may substantially eliminate the need for the filler material and may reduce instances of delamination of the composite component. Such composite components also may have a reduced risk of crack initiation, increased yield, reduced scrap rate, reduced number of out-of-specification components, and improved load carrying capabilities, which may improve the part life. Further, such composite components may improve time on wing and reduce unplanned service calls.

FIGS. 2 through 5 illustrate a method for forming a composite component according to an exemplary embodiment of the present subject matter. As explained in greater detail below, the exemplary method comprises machining a layup of composite plies, or a composite ply pack, while the layup is in a green state to minimize relative movement between the plies in the layup as well as relative movement between the layup and any other sub-assemblies that may be assembled with the layup. The sub-assemblies may include other composite plies, which may be wet or debulked, a composite ply pack, a preform, or the like. The one or more sub-assemblies also may have been machined in a green state prior to assembly with the composite ply layup such that the sub-assemblies may be assembled with a machined surface of one sub-assembly positioned against a machined surface of another sub-assembly.

Referring to FIG. 2, the method includes laying up a plurality of composite plies 100, i.e., a plurality of plies of a composite material such as a CMC or PMC material. The plies 100 may be laid up on a tool, mandrel, mold, or other suitable supporting device or surface. Preferably, each composite ply 100 of the plurality of composite plies 100 is cut, e.g., from a tape as previously described, such that each ply 100 is oversized. That is, each of the plurality of composite plies 100 is longer than a final length of the ply to provide machine stock for machining the green state ply pack to predetermined dimensions as described in greater detail herein. The plurality of composite plies 100 form a composite ply layup 102. In some embodiments, the composite ply layup 102 may be a ply pack layup (which also may be referred to as a composite preform) or the like, which may be generally referred to as a composite ply layup.

Turning to FIG. 3, after the plurality of composite plies 100 are laid up to form the composite ply layup 102, the layup 102 is partially processed to form a green state layup 104. For instance, the layup 102 may be compacted and then processed in an autoclave. The compaction may be performed at atmosphere, i.e., at room temperature and pressure. The autoclave processing may be performed at a reduced temperature, a reduced pressure, and/or for a shorter amount of time compared to a standard autoclave cycle. In some embodiments, partially processing the layup 102 may involve compaction only, i.e., the layup 102 may be compacted without also undergoing a reduced autoclave cycle. In other embodiments, to partially process the layup 102, the layup may undergo a reduced autoclave cycle without being separately compacted.

After partial processing, the composite plies 100 forming the layup 102 retain some flexibility and malleability. Such flexibility and malleability may help in machining the layup 102 and/or assembling one or more sub-assemblies with the layup 102. That is, partially processing the layup 102 achieves a level of consolidation and curing adequate to obtain a strength suitable for further handling and manipulating of the green state layup 104. In contrast, a standard autoclave cycle is typically performed as part of processing a final ply and/or layup assembly to obtain the final component dimensions and to rigidize the component preform. More particularly, the standard autoclave cycle imparts stiffness to the final ply and/or layup assembly through complete drying and/or curing of the composite constituents and produces the final dimensions of the composite component through full consolidation of the plies and/or sub-assemblies.

Further, in embodiments in which the layup 102 is processed in an autoclave, the layup 102 may be autoclaved using soft and/or hard tooling. For instance, the layup 102 may be autoclaved using metallic tooling, i.e., hard tooling, that is shaped to impart a desired shape to the layup 102. As another example, the layup 102 may be autoclaved using soft tooling such as a vacuum bag, e.g., the layup 102 may be supported on a metal tool and then the layup 102 and tool may be bagged and the air removed from the bag to apply pressure to and compact the plies 100 forming layup 102 before the layup 102 is processed in a reduced autoclave cycle as previously described.

As stated, after the composite ply layup 102 is partially processed, the layup 102 is in a green state and thereby forms a green state layup 104, which may be one sub-assembly used to form the composite component. As further illustrated in FIGS. 3 and 4, the green state layup 104 may be machined, e.g., to shape one or more edges or faces of the green state layup 104 by removing a portion of at least one ply 100 within the layup 104. For example, comparing FIGS. 2 and 3, the oversized plies 100 are machined to predetermined dimensions or a particular shape such that the green state layup 104 has an edge and/or surface without irregularities in ply length. That is, a portion of at least one ply 100 is removed along an edge of the green state layup 104, e.g., along the intersection of two surfaces 105 of the layup 104, or a portion of at least one ply 100 is removed along a section of the green state layup 104 that is offset from an edge, e.g., along a surface 105 of the layup 104. Because machining the green state layup 104 gives the layup 104 a clean edge or surface, the plies 100 do not have to be perfectly aligned as they are laid up, e.g., imperfectly aligned plies 100 may be machined to a substantially uniform length. Moreover, the composite plies 100 may move or shift relative to one another during the partial processing portion of the method, particularly during compaction. However, by machining the layup 104 after partially processing the plies 100, irregularities in ply position may be removed, such that the relative movement between plies 100 does not affect the final component shape or create gaps that must be filled with a filler material. Further, because the layup 104 is machined in its green state, the machining process may be referred to as green machining. Green machining may comprise one or more of electrical discharge machining (EDM), i.e., EDM drilling; laser machining; precision machining; or other suitable machining or cutting techniques or processes.

Machining the green state layup 104 defines at least one machined surface 106 or machined edge along the layup 104. As shown in FIG. 4, another sub-assembly 108, such as another green state composite layup, a composite preform, a plurality of wet composite plies (e.g., unconsolidated or uncompacted composite plies), and/or a plurality of debulked or compacted composite plies, may be assembled with the green state layup 104 and, in particular, may be positioned against the machined surface 106. More specifically, after machining, the green state layup 104 may be assembled with one or more sub-assemblies 108. In some embodiments, the sub-assembly 108 may comprise a machined surface 110 similar to the machined surface 106 of the green state layup 104, e.g., the sub-assembly 108 may be another green state layup that was green machined to define the machined surface 110. When the green state layup 104 is assembled with the sub-assembly 108, at least a portion of the machined surface 110 of the sub-assembly 108 may be positioned against at least a portion of the machined surface 106 of the green state layup 104. In such embodiments, the machined surface 106 interfaces with the machined surface 110 such that the assembly comprises an interior machined interface. In other embodiments, the sub-assembly 108 may lack a machined surface 110, such that the machined surface 106 of the green state layup 104 is not positioned against another machined surface when assembled with the sub-assembly 108, or simply, the machined surface 106 of the green state layup 104 is positioned against a non-machined surface of the sub-assembly 108.

As illustrated in FIG. 4, the machined surface 106 of the green state layup 104 is precisely defined to fit with the sub-assembly 108. That is, the machined surface 106 corresponds to or is complementary to the contour of the sub-assembly 108 against which the machined surface 106 is positioned. Thus, green machining the layup 104 may help provide a better fit with other sub-assemblies compared to an unmachined layup. A more precise fit between sub-assemblies may help minimize slipping or relative movement between the sub-assemblies, e.g., during subsequent processing of the sub-assemblies to form the composite component. Further, assembling one or more green state sub-assemblies with other sub-assemblies also may help minimize relative movement between the sub-assemblies during processing.

Referring to FIG. 5, in some embodiments, the green state layup 104 may be a green state ply pack sub-assembly 104 that is assembled with several other sub-assemblies to define a turbine nozzle airfoil 112. In such embodiments, the other sub-assemblies may include a cavity preform 114 and a plurality of composite wrap plies 116 that are wrapped around the green state ply pack 104 and cavity preform 114. That is, assembling the sub-assemblies comprises positioning the green state ply pack 104 against the cavity preform 114 and then wrapping the plurality of composite wrap plies 116 around the green state ply pack 104 and the cavity preform 114. As shown in FIGS. 3 and 5, the machined surface 106 of the green state ply pack 104 is positioned against the cavity preform 114. More particularly, the green state ply pack 104 is machined to fit with the generally curved shape of the cavity preform 114 along an aft edge 114a of the cavity preform 114. As previously described, in some embodiments, the cavity preform 114 also may be in a green state and may have been green machined along the aft edge 114a such that the machined surface 106 of the green state ply pack 104 is positioned against a green machined surface of the cavity preform 114.

After the sub-assemblies are assembled to generally define the composite component, e.g., the turbine nozzle airfoil 112 in the depicted embodiment, the sub-assemblies are processed to form the composite component. For example, processing may include autoclaving the assembled sub-assemblies 104, 114, 116 using a standard autoclave cycle, rather than a reduced autoclave cycle as previously described, to form an autoclaved body. In embodiments in which the composite material is a CMC material, the autoclaved body then may undergo firing (or burn-off) to form a fired body, followed by densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

As shown in the exemplary embodiment of FIG. 5, the turbine nozzle airfoil 112 includes a concave pressure side 118 opposite a convex suction side 120. Opposite pressure and suction sides 118, 120 of the airfoil 112 radially extend between an inner end and an outer end along an airfoil span (not shown). Moreover, pressure and suction sides 118, 120 of the airfoil 112 axially extend between a leading edge 122 and an opposite trailing edge 124, and the pressure and suction sides 118, 120 define an outer surface 126 of the airfoil 112. Further, the cavity preform 114 defines a cavity 128 that may receive a flow of cooling fluid, e.g., a flow of pressurized air diverted from HP compressor 24, for cooling the airfoil 112.

Optionally, after processing, the composite component may be finish machined, if and as needed, and coated with one or more coatings, such as an environmental barrier coating (EBC). For example, the composite wrap plies 116 that are wrapped around the ply pack layup 104 and the cavity preform 114 as shown in FIG. 5 may be oversized such that a portion of the plies 116 extend beyond the desired trailing edge 124 of the turbine nozzle airfoil 112. Accordingly, after processing, the plies 116 may be machined to define the trailing edge 124. In other embodiments, the plies 116 may be machined after the sub-assemblies are autoclaved but before the sub-assemblies are fired and densified.

Of course, the method described with respect to FIGS. 2 through 5 is provided by way of example only. As an example, other known methods or techniques for compacting and/or curing composite plies, as well as for densifying a CMC component, may be utilized. Alternatively, any combinations of these or other known processes may be used. Further, although FIG. 5 depicts a turbine nozzle airfoil 112 as an exemplary composite component formed using the foregoing method, the method also may be used to form other composite components. For instance, the composite component may be an airfoil trailing edge portion; a turbine rotor blade airfoil; an integral turbine rotor blade and platform; a turbine nozzle band; a turbine nozzle having an integral inner band, airfoil, and outer band; a combustor liner; a combustor dome; a shroud, etc.

As one example, FIGS. 6A through 6D illustrate another exemplary embodiment of the present subject matter. FIG. 6A depicts a plurality of composite plies 100 laid up to form a composite ply layup 102. It will be appreciated that the composite ply layup 102 generally forms a block or cuboid-shaped stack of composite plies 100. FIG. 6B illustrates the outline of a preform 104 that will be defined by green machining the composite plies 100. Accordingly, the composite ply layup 102 shown in FIGS. 6A and 6B is partially processed, e.g., compacted and/or autoclaved to consolidate the plies 100 as described above with respect to FIG. 3, to form a green state layup 104. Then, as illustrated in FIG. 6C, the green state layup 104 is machined to define one or more machined surfaces 106. For example, the green state layup 104, which generally is in a block or cuboid shape as described with layup 102, may be machined along a first surface 105a, a second surface 105b, and a third surface 105c to define the green state layup shape depicted in FIG. 6B. That is, a portion of at least one ply 100 may be removed along an edge of the green state layup 104, e.g., along the intersection of two surfaces 105 of the layup 104, or a portion of at least one ply 100 may be removed along a section of the green state layup 104 that is offset from an edge, e.g., along a surface 105 of the layup 104. Referring to FIG. 6D, the machined layup 104 then may be assembled with other composite preforms or plies, such as composite wrap plies 116, and the assembly may be processed to form a composite component, such as an airfoil trailing edge portion, as described with respect to FIGS. 4 and 5.

Accordingly, as described herein, methods are provided for minimizing relative motion between composite sub-assemblies during formation of a composite component. In particular, the methods described herein utilize at least one green machined sub-assembly, such as a layup, ply pack, preform, or ply stack, to provide a better or more precise fit between the green machined sub-assembly and an adjacent sub-assembly, which may minimize relative motion between the sub-assemblies during subsequent processing. Further, green machining one or more of the sub-assemblies to provide a machined surface against which an adjacent sub-assembly may be positioned may help minimize relative motion between the sub-assemblies along the machined surface. By minimizing or eliminating relative motion between the sub-assemblies, gaps between the sub-assemblies can be reduced or eliminated. As such, the need for a filler material for filling gaps may be reduced or eliminated, and/or the volume of densification material (such as silicon in the above example) may be reduced. Further, instances of delamination of the composite component may be reduced, and the composite component also may have a reduced risk of crack initiation, increased yield, reduced scrap rate, reduced number of out-of-specification components (e.g., the methods described herein improve dimensional control thereby increasing the number of composite components that are within dimensional tolerances), and improved load carrying capabilities, which may improve the part life. Moreover, such composite components may improve time on wing and reduce unplanned service calls. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming a composite component, comprising:
   laying up a plurality of composite plies to form a composite ply layup;
   partially processing the composite ply layup to form a green state layup;
   machining the green state layup;
   machining a machined sub-assembly of one or more sub-assemblies to form a machined surface of the machined sub-assembly;
   assembling the green state layup with the one or more sub-assemblies; and
   processing the green state layup and the one or more sub-assemblies to form the composite component,
   wherein machining the green state layup comprises removing at least a portion of a ply of the green state layup to shape the green state layup to complement a contour of the machined sub-assembly against which the green state layup is positioned,
   wherein machining the green state layup defines a machined surface along the green state layup,
   wherein machining the machined sub-assembly comprises removing at least a portion of the machined sub-assembly to form the machined surface of the machined sub-assembly, and
   wherein assembling the green state layup with the machined sub-assembly comprises positioning at least a portion of the machined surface of the green state layup against at least a portion of the machined surface of the machined sub-assembly to form an assembly having an interior machined interface comprising the machined surface of the green state layup and the machined surface of the machined sub-assembly.

2. The method of claim 1, wherein partially processing the composite ply layup comprises compacting the composite ply layup.

3. The method of claim 1, wherein processing the green state layup and the one or more sub-assemblies comprises:
   autoclaving the green state layup and the one or more sub-assemblies to form an autoclaved body;
   firing the autoclaved body to form a fired body; and
   densifying the fired body to form the composite component.

4. The method of claim 1, wherein assembling the green state layup with one or more sub-assemblies comprises positioning at least a portion of the machined surface of the green state layup against at least a portion of a non-machined surface of a sub-assembly.

5. The method of claim 1, wherein the one or more sub-assemblies comprises a plurality of wet composite plies prior to processing the green state layup and the one or more sub-assemblies.

6. The method of claim 1, wherein the one or more sub-assemblies comprises a second green state layup having a machined surface prior to processing the green state layup and the one or more sub-assemblies.

7. The method of claim 1, wherein the one or more sub-assemblies comprises a plurality of compacted composite plies prior to processing the green state layup and the one or more sub-assemblies.

8. The method of claim 1, wherein the removed portion of the ply of the green state layup is along an edge of the green state layup.

9. The method of claim 1, wherein the removed portion of the ply of the green state layup is offset from an edge of the green state layup.

10. The method of claim 1, wherein the plurality of composite plies forming the composite ply layup are oversized to provide machine stock for machining the green state layup to predetermined dimensions.

11. The method of claim 1, wherein the composite component is a gas turbine engine component.

12. The method of claim 1, wherein the composite plies are formed from a ceramic matrix composite material.

13. A method for forming a composite component, comprising:
    laying up a plurality of composite plies to form a ply pack;
    partially processing the ply pack to form a green state ply pack;
    machining the green state ply pack to define a machined surface along the green state ply pack;
    machining a cavity preform to define a machined surface along the cavity preform;
    assembling the green state ply pack with the cavity preform; and
    processing the green state ply pack and cavity preform to form the composite component,
    wherein the composite component is a turbine nozzle airfoil,
    wherein machining the cavity preform comprises removing at least a portion of the cavity preform to form the machined surface of the cavity preform, and
    wherein assembling the green state ply pack with the cavity preform comprises positioning at least a portion of the machined surface of the green state ply pack against at least a portion of the machined surface of the cavity preform to form an assembly having an interior machined interface, the interior machined interface comprising the machined surface of the green state ply pack and the machined surface of the cavity preform.

14. The method of claim 13, wherein the machined surface of the green state ply pack is positioned against an aft edge of the cavity preform, wherein the cavity preform is machined to remove at least a portion of the cavity preform along the aft edge such that the aft edge forms the machined surface of the cavity preform.

15. The method of claim 13, further comprising:
    assembling a plurality of composite wrap plies with the green state ply pack and the cavity preform,
    wherein assembling the composite wrap plies comprises wrapping the plurality of composite wrap plies around the green state ply pack and the cavity preform.

16. The method of claim 13, wherein partially processing the ply pack comprises compacting the ply pack.

17. A method for forming a composite component, comprising:
    laying up a plurality of composite plies to form a composite ply layup;
    compacting the composite ply layup to form a green state layup;
    machining the green state layup;
    machining a machined sub-assembly of one or more sub-assemblies to form a machined surface of the machined sub-assembly;
    assembling the green state layup with the one or more sub-assemblies; and
    processing the green state layup and the one or more sub-assemblies to form the composite component,
    wherein machining the green state layup comprises removing at least a portion of a ply of the green state layup to define a machined surface along the green state layup, wherein machining the machined sub-assembly comprises removing at least a portion of the machined sub-assembly to form the machined surface of the machined sub-assembly, and wherein assembling the green state layup with one or more sub-assemblies comprises positioning at least a portion of the machined surface of the green state layup against at least a portion of the machined surface of the machined sub-assembly to form an assembly having an interior machined interface comprising the machined surface of the green state layup and the machined surface of the machined sub-assembly.

\* \* \* \* \*